June 12, 1934.  L. M. FRANCIS  1,962,497
WHEELED VEHICLE
Original Filed Feb. 6, 1931   3 Sheets-Sheet 1
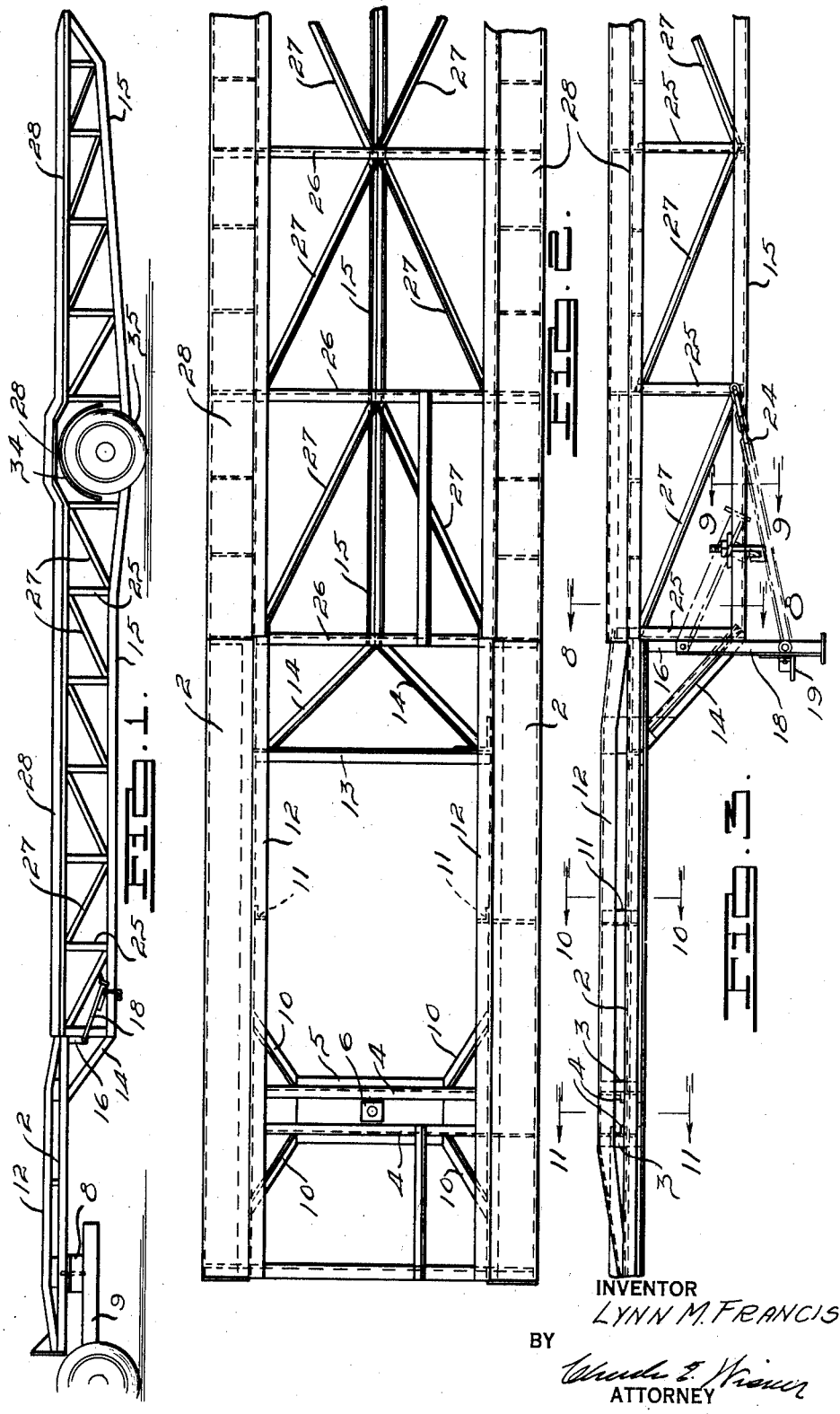
INVENTOR
LYNN M. FRANCIS
BY
ATTORNEY

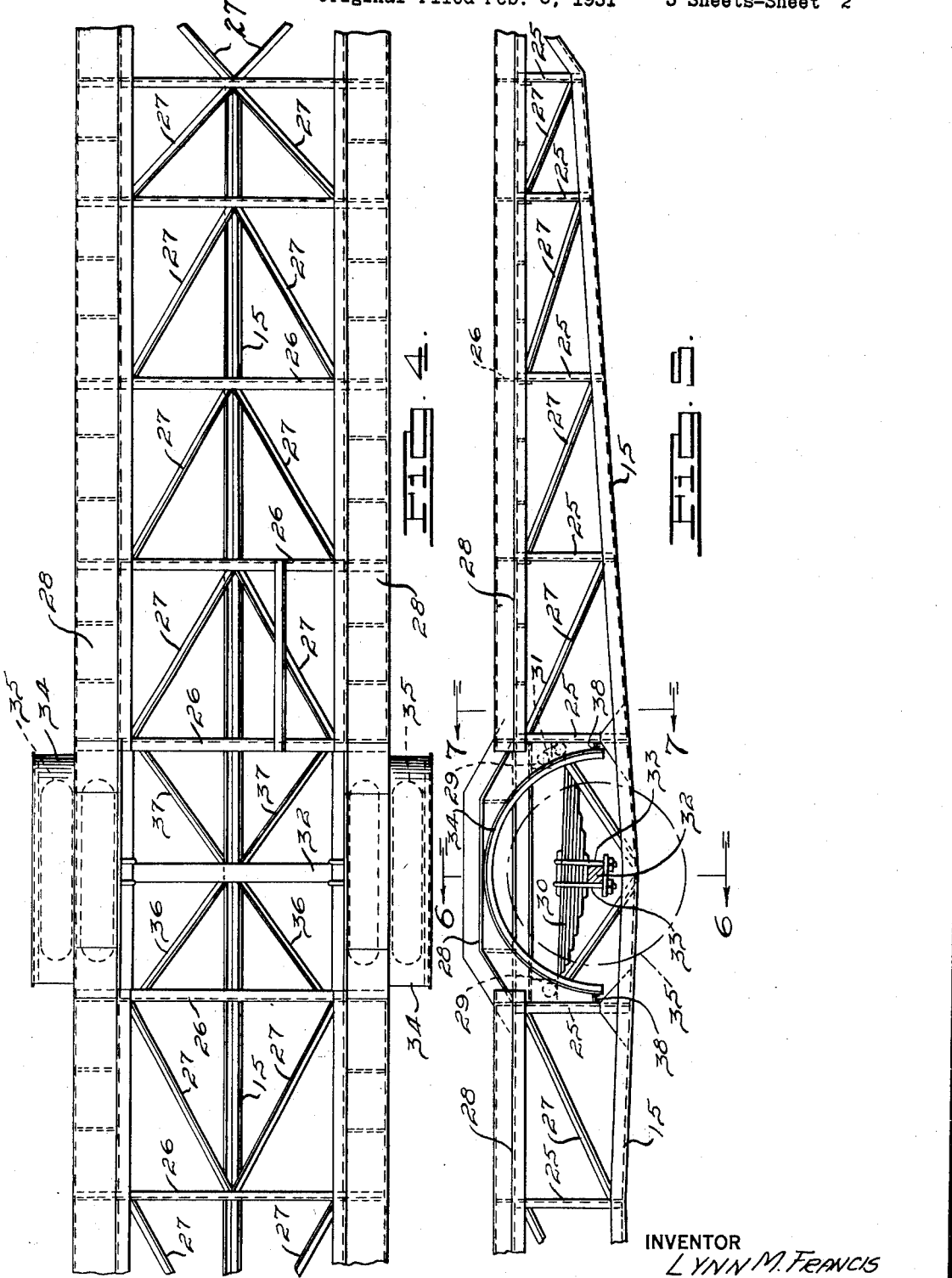

June 12, 1934.   L. M. FRANCIS   1,962,497
WHEELED VEHICLE
Original Filed Feb. 6, 1931    3 Sheets-Sheet 3
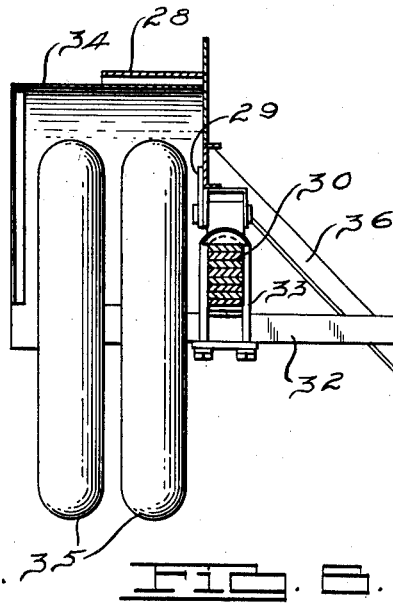
FIG. 6.
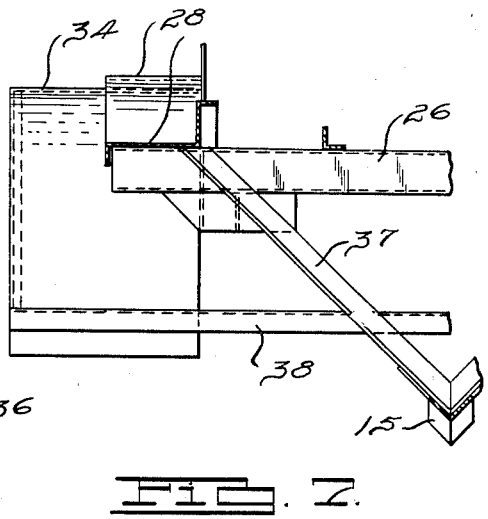
FIG. 7.
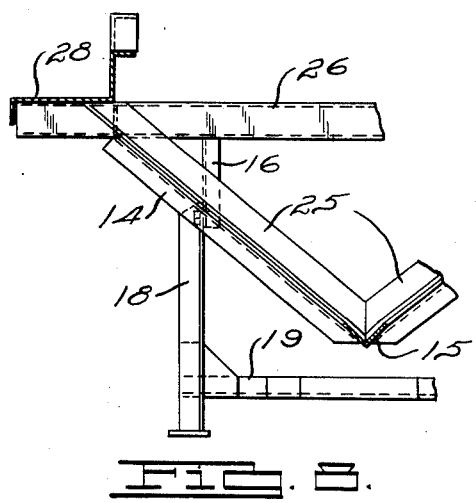
FIG. 8.
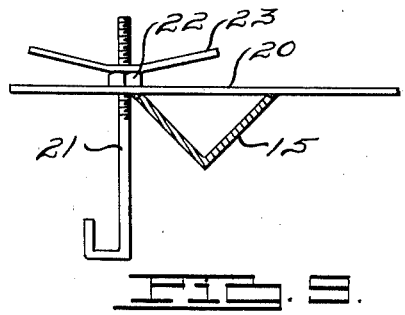
FIG. 10.
FIG. 9.
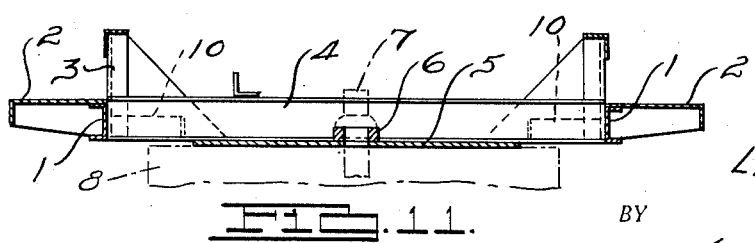
FIG. 11.
INVENTOR.
LYNN M. FRANCIS
BY
ATTORNEY.

Patented June 12, 1934

1,962,497

UNITED STATES PATENT OFFICE 1,962,497

WHEELED VEHICLE

Lynn M. Francis, Detroit, Mich., assignor to Mechanical Handling Systems Incorporated, Detroit, Mich., a corporation of Michigan Application February 6, 1931, Serial No. 513,921
Renewed November 3, 1933

9 Claims. (Cl. 280—106)

This invention relates to wheeled vehicles particularly adapted for use as trailer for transportation of automobiles for which purpose the forward end may be pivotally mounted relative to a truck or other propelling device, and an object of the invention is to provide in a wheeled vehicle, a fabricated frame of strong rigid construction of materially less weight and cost than the usual type of wheeled vehicle or trailer structures.

A further object of the invention is to provide a frame for a vehicle which is of triangular form in cross section, the base of which provides the platform of the vehicle and the apex of which is positioned therebelow and in which the base includes a pair of side rails at each corner of a construction providing a trackway by means of which automobiles or other wheeled vehicles may be moved thereonto and maintained from lateral displacement and the apex is provided by a single rail of the desired cross-sectional form connected with the side rails or trackways by inclined members riveted or welded at the opposite ends to the respective members and further includes brace members extending between the successive inclined members running from the apex to the trackways on opposite sides.

Heretofore, vehicles adapted for this purpose were provided with a heavy platform or a pair of trackways usually supported by a rectangular framework, which previous construction is not only costly to manufacture but is of quite considerable weight which adds to the cost of transportation. By my improved construction the weight of the vehicle is reduced to a material extent and requires considerable less framework in its construction and thus lessens the cost of manufacture and reduces the weight.

A particular feature of the invention therefore resides in the provision of a frame of substantially triangular cross section with portions of the frame providing the trackway for the wheeled vehicles to be moved thereonto for transportation.

These and other objects and novel features of the invention are hereinafter more fully described and claimed, and the preferred form of construction of a wheeled vehicle embodying my invention is shown in the accompanying drawings in which—

Fig. 1 is a side elevation of a trailer embodying my invention.

Fig. 2 is a plan view of the forward end of the trailer.

Fig. 3 is a side elevation thereof.

Fig. 4 is a plan view of the rear portion of the trailer.

Fig. 5 is a side elevation thereof with the wheels removed.

Fig. 6 is a section taken on line 6—6 of Fig. 5.
Fig. 7 is a section taken on line 7—7 of Fig. 5.
Fig. 8 is a section taken on line 8—8 of Fig. 3.
Fig. 9 is a section taken on line 9—9 of Fig. 3.
Fig. 10 is a section taken on line 10—10 of Fig. 3.
Fig. 11 is a section taken on line 11—11 of Fig. 3.

The vehicle shown is in the form of a trailer for the transportation of automobiles or other wheeled vehicles. At the forward end, as shown in Figs. 2, 3 and 11, a pair of channel frame members 1 are provided to which the track members 2 are welded, as shown in Fig. 11. A pair of up-right angles 3 are provided at the forward end which are welded to the channel frames 1, as shown in Figs. 3 and 11, and a pair of transverse channel frames 4 are welded to the up-rights 3 and extend across between the frames as shown in Figs. 2 and 11. A plate 5 is welded to the lower surfaces of the frame members 4 and a block 6 is welded to this plate and is provided with a hole therethrough and through the plate 5 through which the king-pin 7 may extend into a cross-member 8 on the truck frame 9, as shown in Fig. 1. This provides a pivotal connection for the trailer on the truck and angle members 10 are provided between the ends of the plate 5 and the frame members 1, as shown in Fig. 2, to further support the plate 5.

Additional up-rights 11 are also provided, as shown in Figs. 2, 3 and 10, for supporting the angle strips 12 and a transverse frame member 13 is provided connecting the frame members 1 and two angle bars 14 extend downwardly therefrom and are welded to an angle iron rib 15 which extends longitudinally of the remainder of the trailer, as shown in Figs. 2, 3, 5 and 8. A pair of fixed arms 16 extend downwardly from a cross frame member 26 of the trailer, as shown in Figs. 3 and 8, and a leg 18 is pivotally connected to each arm 16 and the two legs are connected by a frame member 19 which is welded thereto. As shown in Fig. 9, a plate 20 is welded across the upper edges of the frame member 15 and a hook-bolt 21 is supported in the plate so that the legs 18 and member 19 may be turned back, as shown in Fig. 3, and the hook-bolt 21 may be hooked over the edge of the frame member 19 to hold the legs up out of the way when the trailer is connected to the truck. To release the legs, the nut 22 is unthreaded by means of the wing-arms 23 after which the hook-bolt may be unhooked from the member 19 to allow the legs to again assume the position shown in full lines in Fig. 3. A chain 24 is connected to each leg and to the transverse brace members 25, as shown in Fig. 3, to limit turning movement of the legs 18.

The transverse brace members 25 are provided at intervals throughout the length of the trailer, as shown in Figs. 3 and 8, and are connected to the longitudinal member 15 and to the track members 28 to support the member 15 and angle braces 27 are provided, as shown in Figs. 2 and 3, which are connected to the member 15 and to the track members 28 to strengthen the frame. The transverse brace members 25 and the angle brace members 27 and the cross frame members 26 connecting the track members 28 are repeated throughout the length of the trailer to rigidly connect the member 15 to the track members 28 and form a rigid construction, as shown in Figs. 2, 3 and 8. As shown in Fig. 5, a pair of plates 29 are secured to the framework and a leaf-spring 30 is pivotally mounted in one plate 29 and is pivotally connected to a shackle-bolt 31 which is pivoted on the other plate 29. The axle 32 extends across the frame above the member 15 and the spring 30 is secured to the axle 32 by means of the U bolts 33. A fender 34 is provided beneath which the wheels 35 are mounted and the track members 28 are raised over the fenders 34, as shown in Figs. 5, 6 and 7. By this arrangement, the automobiles may be placed on the tracks 28 and may be moved over the wheels 35 on the raised portions of the tracks 28. The fenders 34 at the lower edges are welded to cross frame members 38 which are welded to the adjacent transverse frame members 25, as shown in Figs. 5 and 7.

This arrangement provides a trailer which will carry a series of automobiles and consists of a rigid trinangular construction which forms a support for the automobiles during transit. Two trailer wheels 35 are preferably provided on each side, as shown in Fig. 6, and special frame members 36 and 37 are utilized to brace the frame at the wheel supports, as shown in Fig. 4. By making a frame substantially triangular or V shaped cross-section, great rigidity is provided as well as light weight and fewer parts are required than in a trailer in which the framework is rectangular in cross-section. It will be evident that the triangular character of construction may be utilized in wheeled vehicles of various types and that the invention is not confined to the use solely with a trailer vehicle.

From the foregoing description, it becomes evident that the device is very simple and efficient in operation, will not easily get out of order, is of strong, rigid and light construction and provides a device which accomplishes the objects described.

Having thus fully described my invention, its utility and mode of operation, what I claim and desire to secure by Letters Patent of the United States is—

1. In a vehicle, a pair of spaced track members positioned in a horizontal plane, a series of transverse members connecting the track members, a longitudinal frame member occupying a plane below the track members, a series of transverse and diagonal brace members connecting the track members and longitudinal frame member forming therewith a triangular framework, a pair of wheels supporting the framework between the ends thereof, a flat framework connected to the forward end of the triangular framework, and a pivot pin carried by the flat framework and adapted for pivotal connection to a tractor.

2. In a vehicle, a pair of track members extending longitudinally of opposite sides of the vehicle, a series of transverse members welded to and connecting the track members, a longitudinal frame member extending beneath and equi-distantly from the track members, a series of transverse and diagonal frame members connecting the track members and longitudinal frame member, and wheels supporting the framework between the ends.

3. In a vehicle, a pair of spaced track members, a series of transverse members connecting the track members, a longitudinal frame member extending beneath and equi-distantly from the track members, a series of transverse frame members connecting the track members and the longitudinal frame member, a series of diagonal brace members connecting the track members and the longitudinal frame member, the diagonal brace members extending between the transverse frame members, a pair of wheels supporting the framework intermediate its ends, the track members being raised to pass over the respective wheels to provide a continuous trackway, and means at the forward end of the vehicle for pivotally connecting the same to a tractor.

4. In a vehicle, a pair of spaced, longitudinally positioned track members, a series of transverse members welded to and connecting the track members, a longitudinal frame member extending beneath the track members in equi-distantly spaced relation therewith, a series of transverse frame members connecting the track members and the longitudinal frame member, a series of diagonal brace members connecting the track members and the longitudinal frame member and extending between the transverse frame members, a pair of wheels supporting the frame intermediate its ends, and means carried by the forward portion of the frame for pivotally connecting the vehicle to a tractor.

5. In a vehicle, a framework comprising a pair of side members, a series of transverse members connecting the side members, a longitudinal frame member positioned centrally beneath the side members, a series of transverse frame members connecting the side members and the longitudinal frame member, a series of diagonal brace members connecting the track members and the longitudinal frame member, a flat framework connected to the forward end of the frame thus formed, and means for pivotally connecting the flat framework to a tractor vehicle.

6. In a vehicle, a pair of spaced, longitudinally extending track members, a series of transverse members welded to and connecting the track members, a longitudinal frame member positioned beneath the track members equi-distantly therefrom, a series of transverse frame members connecting the track members and the longitudinal frame member, a series of diagonal brace members connecting the track members and the longitudinal frame member and extending between the transverse frame members, a pair of springs connected to the frame intermediate its ends, an axle supported by the springs, and a wheel on each end of the axle, said track members being positioned over the respective wheels.

7. In a vehicle, a pair of spaced track members, a series of transverse members welded to and connecting the track members, a longitudinal frame member extending centrally beneath the track members, a series of transverse brace members connecting the track members and the longitudinal frame member, a series of diagonal brace members connecting the track members and the longitudinal frame member between the transverse brace members, and a pair of wheels supporting the framework intermediate its ends.

8. In a vehicle, a pair of longitudinally extending track members, a longitudinal frame member extending beneath the track members and in a plane centrally between the track members, a series of inclined frame members connecting the longitudinal frame member and track member together, cross members connecting the two track members, and a pair of wheels supporting the track members intermediate the ends thereof.

9. In a wheeled vehicle, a framework substantially triangular in cross section, and having the apex thereof extending downwardly, the frame members for the other two edges of the triangular framework being formed to provide a trackway for a wheeled vehicle, and wheels for supporting the framework.

LYNN M. FRANCIS.